United States Patent Office 2,829,225
Patented Apr. 1, 1958

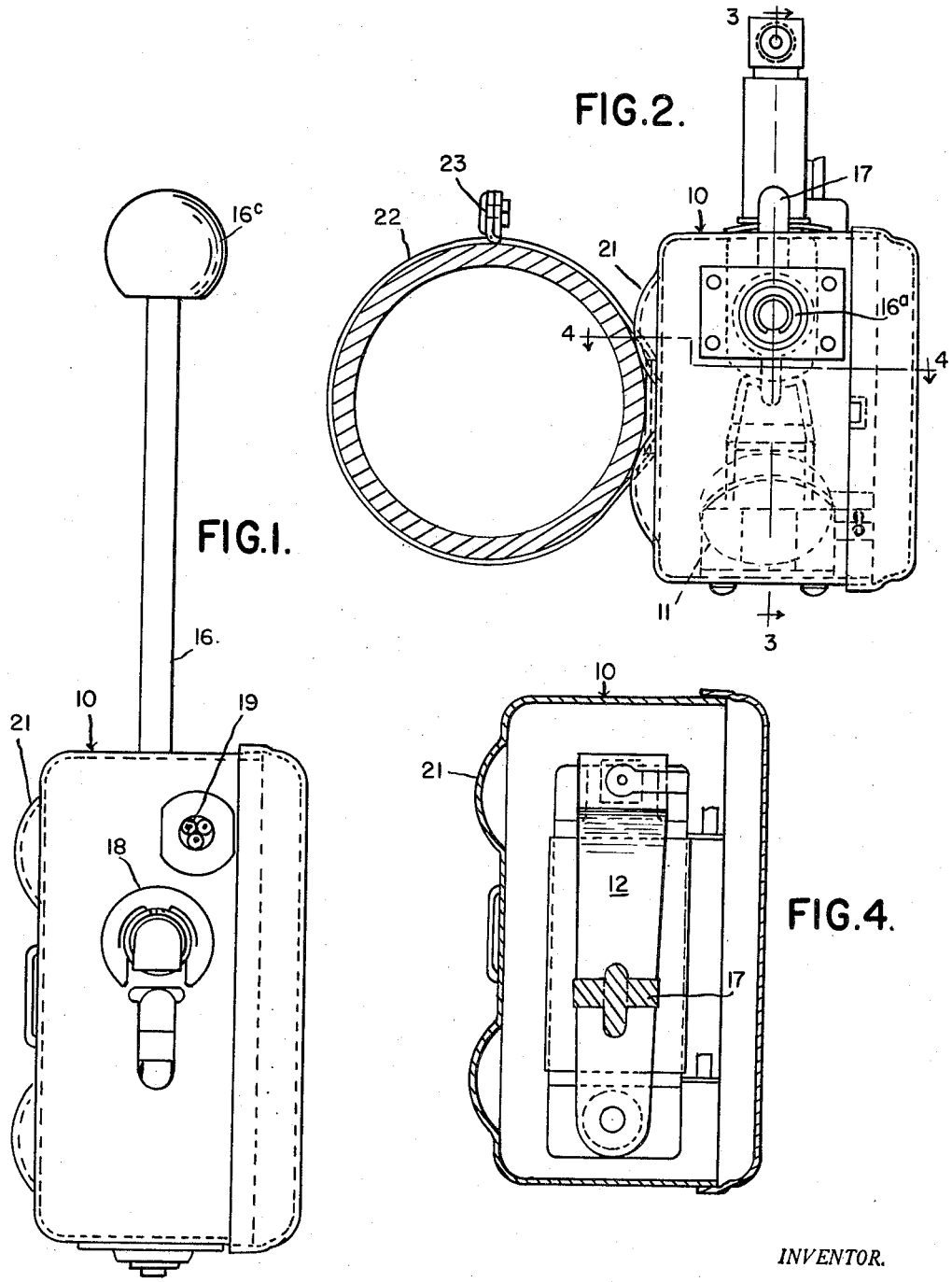

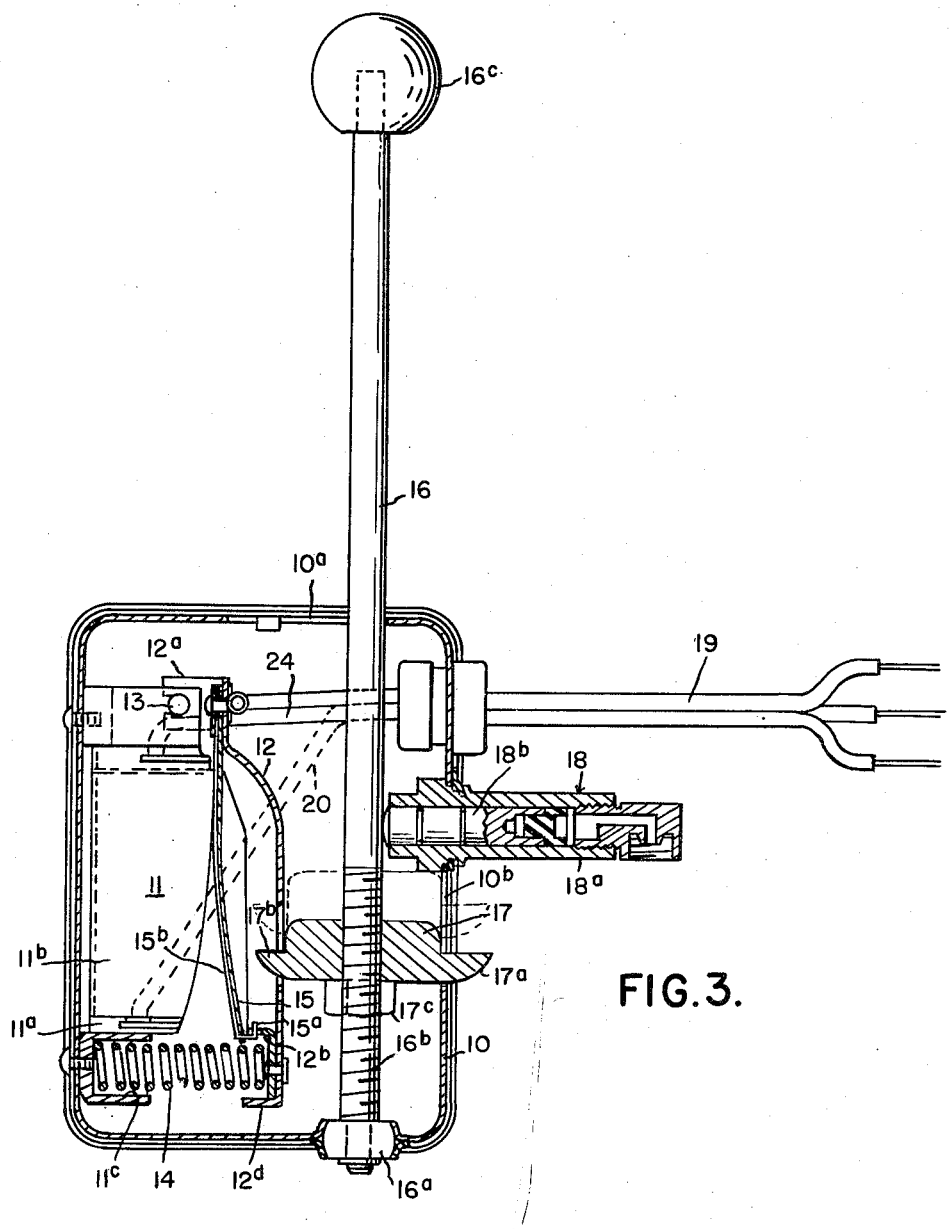

2,829,225

ELECTRIC CONTROLLER

Elmer R. Ross, Detroit, Mich., assignor to Kelsey-Hayes Company, a corporation of Delaware Application February 14, 1955, Serial No. 488,004

12 Claims. (Cl. 201—62)

The invention relates generally to control means for mechanisms that are electrically energized from a source at relatively low potential. More particularly the invention relates to control means for brakes on a trailer vehicle. Trailer brakes should be applied substantially simultaneously with the application of the brakes on the tow car and may be operated by the same pedal. Usually the brake mechanism on the tow car is hydraulic but it is advantageous to electrically energize the brakes on the trailer. Also, trailers vary in size and load and therefore the braking effect should be correspondingly varied relative to that of the tow car.

It is the object of the invention to obtain a construction of electric controller located on the tow car through which the electrical energy for operating the brakes on the trailer is controlled to produce a smooth application of the braking force. It is another object to provide an electric controller which can be manually operated to apply the trailer brakes independently of the brakes on the tow car or can be operated by means dependent upon the application of the brakes on the tow car to apply the trailer brakes. It is a further object to provide means of adjustment of this braking force corresponding to variations in trailer load and for road conditions. It is a further object to provide adjustment for said control means which will vary the slope curve of the brake power application.

With these objects in view the invention consists in the construction as hereinafter set forth.

In the accompanying drawings:

Fig. 1 is an elevation of the control unit.

Fig. 2 is a bottom plan view of Fig. 1 indicating in full lines the steering column on which the unit may be mounted.

Fig. 3 is a section on line 3—3, Fig. 2.

Fig. 4 is a section on line 4—4, Fig. 2.

The electrical energy for operating the brakes is supplied by a storage battery and/or generator on the tow car and usually at a potential of approximately 6 or 12 volts. The particular construction of the brake and its energizing motor is not a part of the instant invention and is neither illustrated nor described. However to control the application of the braking force the current for the motor is varied by a controller having a housing 10 which may be mounted on the steering column of the tow car or on the cowl or in any other convenient location for operation. The controller has a variable resistor 11 within the housing and formed of a dielectric core 11$^a$ and a continuous resistor coil 11$^b$ wound on the core. The coil is of conventional construction. A smooth increase in flow of current can be produced by successively shunting out each of the convolutions of the resistor coil but here a difficulty arises which my construction is designed to overcome. If this shunting out is effected by a sliding of the shunt contact over the coil, wear will be excessive with short life of the structure. I have overcome the difficulty by progressively contacting the shunting member with the coil and progressively conforming the shunting member to the coil and at the same time imparting a very slight creeping movement of the shunting member over the coil which insures good electrical contact with each of the convolutions, the construction being as follows:

The longitudinal contour of the core 11$^a$ on the side thereof which is engaged by the shunting member is a convex arcuate curve. Adjacent to this side is a rockable conductor support 12 which at one end has flanges 12$^a$ embracing a portion of the core 11$^a$ and slotted to engage a fulcrum pin 13. From this end the rockable support or member 12 is bowed outwardly away from the resistor 11 and at its free end is resiliently sustained by a coil spring 14. Between the two ends is an arcuate resilient member 15 which is riveted or otherwise secured to the member 12 above the fulcrum point and at its opposite end has a return-bend 15$^a$ which engages a slot in a clip 12$^b$ secured to the member 12. Resilient member 15 includes an electrically conductive facing strip 15$^b$ appropriately reinforced by a further spring strip. In the released position, the resilient member 15 is spaced from the resistor 11 by the fulcrum pin 13 and the coil spring 14 at the ends of the rockable member 12.

It is to be noted that the fulcrum of the rockable support member 12 at pin 13 is offset laterally in reference to the line of longitudinal contact of the conducting strip 15$^b$ with the resistor coil 11$^b$. Hence as the member 12 is rocked toward the resistor 11, the resilient conductor strip 15$^b$ first engages the end of coil 11$^b$ adjacent fulcrum 13, which point of engagement then becomes a secondary fulcrum for the rockable member 12, and will progressively conform by being warped to the curved contour and successively contact with the convolutions of the resistor coil. During the final portion of the rocking, the end of the rockable member 12 having the flanges 12$^a$ floats slightly upwardly, or to the right as seen in Fig. 3, with the fulcrum pin 13 serving as a guide to control a longitudinal component of creeping movement of the strip 15$^b$ by slidably engaging one of the forked flanges 12$^a$ of member 12. Hence during the rocking there is a slight creeping action of the surface of the resilient member 15 over the convolutions of the resistor coil 11$^b$ by reason of the positioning of the fulcrum pin 13 and the warping of the resilient member 15. This rocking of the member 12 is accomplished by a lever 16 which is universally pivotally fulcrumed at 16$^a$ to the wall of the housing 10 adjacent to the free end of the member 12 and extends from the fulcrum 16$^a$ through a slot 10$^a$ in the opposite wall of the housing. On this lever 16 is a member 17 which, for a reason later described, engages a screw threaded portion 16$^b$ of the lever. The member 17 bears against the member 12 so that a rocking movement of the lever will transmit a corresponding rocking movement to said member 12. The lever may be either manually rocked by a handle 16$^c$ at its outer end or it may be so moved by a hydraulic motor 18, the cylinder 18$^a$ of which is mounted on the housing 10 and the piston 18$^b$ of which bears against the side of the lever. This motor may be connected in the hydraulic system which operates hydraulic brakes on the tow car and may be operated simultaneously therewith.

With the construction as thus far described the member 12 in its normal or released position is slightly spaced from the member 11 due to the position of the fulcrum pin 13 at one end and the pressure of the spring 14 at its opposite end. An insulated conductor 19 connects the member 12 with the source of electric current (not shown) and the insulated conductor 20 leads from one end of the resistor coil 11$^b$ (the lower end, Fig. 3) to the trailer brake motors. In the position shown the circuit is broken as the member 15 is out of contact with any portion of the coil. The initial movement of the lever 16 either operated manually or by the hydraulic motor 18 will contact the member 15 with the resistor coil 11$^b$ at the opposite end from that connected to the conductor 20 so that the entire resistance of this coil is in the brake energizing circuit. Further movement of the lever will cause the member 15 to move with a combined rocking and creeping motion over the convolutions of the coil successively shunting them out and thereby lowering the resistance and increasing the current passing through the circuit. Due to the slight creeping action good contact will be made with each successive convolution of the coil so that a gradual and smooth increase in current volume conveyed to the brake motors is effected and all contacting convolutions cooperate in conducting the current. The diameter of the piston 18$^b$ is relatively small as the only work which it performs is to compress the spring 14, the latter being slightly preloaded to hold the member 12 in normal position. The increasing resistance of the spring during the contacting of the member 15 with the coil 11$^b$ reacts to transmit a "feel" back to the operating lever 16 which may be manually manipulated at any time through the handle 16$^c$ to operate the trailer brakes independently of the brakes on the tow car.

As above stated trailers vary in size and also in the loads which they carry. This makes it desirable to provide adjustment means through which the operation of the lever 16 and the resistor controlled thereby may be altered. I have provided a very simple construction for this purpose which consists in the threaded engagement between the lever 16 and the member 17 thereon. Thus, if the lever 16 is manually rotated by turning the handle 16$^c$ which is permitted by the universal pivotal fulcrum 16$^a$, the member 17 will be adjusted in relation to the fulcrum 16$^a$ of the lever 16 and also to the fulcrum 13 of the member 12. Consequently when said member 17 is in the position nearest to the fulcrum 16$^a$ and farthest from the fulcrum 13 resistance to the rocking of the member 12 by the lever 18 will be less than when said member 17 is farther from its fulcrum 16$^a$ and nearer to the fulcrum 13. Such adjustment may be made to correspond to changes in trailer load, adjustment of the member 17 nearest to the fulcrum 16$^a$ being for heavy loads and adjustment away from said fulcrum being for light loads. This adjustment may be also useful for change in road conditions.

During such adjustment the member 17 must be held against rotation which is accomplished by providing a projecting portion 17$^a$ which extends through a slot 10$^b$ in the adjacent portion of the housing 10. One end of this slot forms a stop for limiting adjustment in the direction of the fulcrum 16$^a$. Another projection 17$^b$ engages a slot 12$^c$ in the member 12 and the end of this slot forms a stop limiting adjustment in the opposite direction. The projecting portion 17$^a$ also serves as an indicator of the amount of adjustment. To prevent accidental rotation of the lever 16 a lock nut 17$^c$ normally binds the member 17 to said lever and must be released before any adjustment can be made. The resilient member 15 is preferably formed of a facing strip 15$^b$ and a reinforcing strip both strips being riveted at one end to the rockable member 12 and the strip 15$^b$ having the return-bend 15$^a$ engaging a slot in the clip 12$^b$. The facing strip, which is adapted to contact with the resistor, is preferably formed of copper alloy to provide good electrical conduction while the reinforcing strip is preferably formed of tempered steel. The spring 14 may be retained at one end by a recess 11$^c$ in the core member 11$^a$ and at the other end by the clip 12$^b$ cooperating with a flange 12$^d$ on the rockable member 12. To facilitate mounting of the unit upon a cylindrical steering post of the vehicle the housing 10 is provided on one face thereof with spherical embossments 21 forming bearings at circumferentially spaced points on said post. A strap 22 and clamping screw 23 secure the housing to the post. A stop-light may be connected in a circuit, including a conductor 24, which latter is connected to the end of the coil 11$^b$ closest to the first contacting point of the member 15$^b$. Thus, the resistance of said coil is not included in the stop-light circuit which, however, is closed by the member 15$^b$.

The device makes it possible to obtain a very flexible control of the brake magnets of various trailer brake installations under differing load conditions by a simple adjustment of the actuator member 17 on the lever 16. Curves plotted to magnet amperage against hydraulic or manual pressure at the lever 16 exhibit very desirable smoothness of slope in a continuous, stepless control operation ranging from one extreme, say in the control of a four brake installation handling a heavy trailer load, to a two brake trailer under light load. At the first extreme the curve is a steep one, but desirably smooth over the plotted values, while at the other extreme it is equally smooth but of much milder slope.

What I claim as my invention is:

1. An electrical current control device comprising a dielectric core member having a longitudinal helical resistor wound thereabout, a pivoted rockable member, means to floatingly pivot said rockable member, including means engaging the same to control its movement longitudinally of said resistor in the rocking thereof, a resilient bowed conductor carried by said rockable member and longitudinally engageable with said resistor, said conductor being normally out of contact with said resistor and connected with a source of electrical current, and means for rocking said member to first contact said conductor with said resistor at one end thereof and to progressively move said conductor over and in contact with the successive convolutions of said resistor to reduce the resistance thereof and increase the current flow therethrough.

2. The construction as in claim 1 in which the pivot of said rockable member is offset in relation to said first contact of said conductor with said resistor to cause during said movement a slight creeping of said conductor over said resistor.

3. The construction as in claim 2 in which said core member and resistor thereon have a convex contour in the plane of movement of said conductor.

4. The construction as in claim 3, in which said rocking means is a lever generally parallel to said core member, and a bearing on said lever engaging said rockable member to actuate the latter, said bearing being adjustable on said lever towards and from the fulcrum of the lever.

5. The construction as in claim 4 in which said bearing has a threaded engagement with a portion of said lever and a sliding engagement with said rockable member, said lever having a universal pivotal connection with its fulcrum which permits rotation of the lever about its longitudinal axis to adjust said bearing.

6. The construction as in claim 4 in which said lever extends from its fulcrum in a direction opposite to the direction of said rockable member from its pivot means.

7. The construction as in claim 4 having a hydraulic motor operating said lever and the trailer brakes controlled thereby.

8. An electrical current control device comprising fixed and movable supports, longitudinally extending conductor and resistor members carried by said supports for progressive longitudinal engagement with one another, means guiding said movable support for rocking and bodily shifting movement on said fixed support, said guiding means being laterally offset from the line of said longitudinal engagement of said members, at least one of said members being longitudinally convex in relation to the other member and said members being positioned by said supports for said progressive engagement, with creeping contact therebetween, upon rocking of said movable support, and actuating means for said movable support, including an actuator member operatively engaged therewith and adjustable longitudinally thereof to vary the point of actuation.

9. An electrical current control device comprising fixed and movable supports, longitudinally extending conductor and resistor members carried by said supports for progressive longitudinal engagement with one another, means guiding said movable support for rocking and bodily shifting movement on said fixed support, said guiding means being laterally offset from the line of said longitudinal engagement of said members, at least one of said members being longitudinally convex in relation to the other member and said members being positioned by said supports for said progressive engagement, with creeping contact therebetween, upon rocking of said movable support, and actuating means for said movable support, including an actuator member operatively engaged therewith and adjustable longitudinally thereof to vary the point of actuation and manually and fluid pressure operated means acting optionally on said actuator to control the same.

10. An electrical current control device comprising a continuous resistor member having a fixed mount, a rockable conductor support, pivot means guiding said support for rocking and bodily floating movement on said fixed mount, a conductor member carried by said rockable support to progressively engage said resistor member longitudinally, said pivot means being offset laterally in relation to the line of said progressive engagement, at least one of said members having a longitudinally bowed portion which is convex in relation to the other member and has progressive longitudinally creeping contact therewith as said support is rocked, and means to actuate said conductor support, including an actuator engageable with said support and adjustable longitudinally thereof to vary the point of engagement of the actuator with said support.

11. An electrical current control device comprising a longitudinal helical resistor member, a pivoted rockable conductor support, means to floatingly pivot said rockable support including means engaging the same to control its movement longitudinally of said resistor member in the rocking thereof, a resilient conductor member carried by said support and longitudinally progressively engageable with said resistor member, said conductor member being normally out of contact with said resistor member and connected to a source of electrical current, at least one of said members having a longitudinally bowed portion which is convex in relation to the other member, and means for rocking said support to first contact said conductor member with said resistor member at one end thereof and to progressively move said conductor member over and in contact with the successive convolutions of said resistor member while at the same time causing a slight longitudinal creeping of said conductor member relative to said resistor member, thereby to reduce the resistance of said resistor member and increase the current flow therethrough.

12. An electrical current control device comprising fixed and movable supports, longitudinally extending conductor and resistor members carried by said supports for progressive longitudinal engagement with one another, means guiding said movable support for rocking relative to said fixed support, at least one of said members being longitudinally convex in relation to the other member and said members being positioned by said supports for said progressive engagement upon rocking of said movable support, and actuating means for said movable support, including an actuator member operatively engaged therewith and adjustable longitudinally thereof to vary the point of actuation.

References Cited in the file of this patent
UNITED STATES PATENTS

| | | |
|---|---|---|
| 1,371,192 | Bentley | Mar. 18, 1921 |
| 1,658,666 | Burgener et al. | Feb. 7, 1928 |
| 1,952,679 | Leveen | Mar. 27, 1934 |
| 2,134,323 | Beach | Oct. 25, 1938 |
| 2,316,170 | Kesselring et al. | Apr. 13, 1943 |